Figures 1, 2, 3:
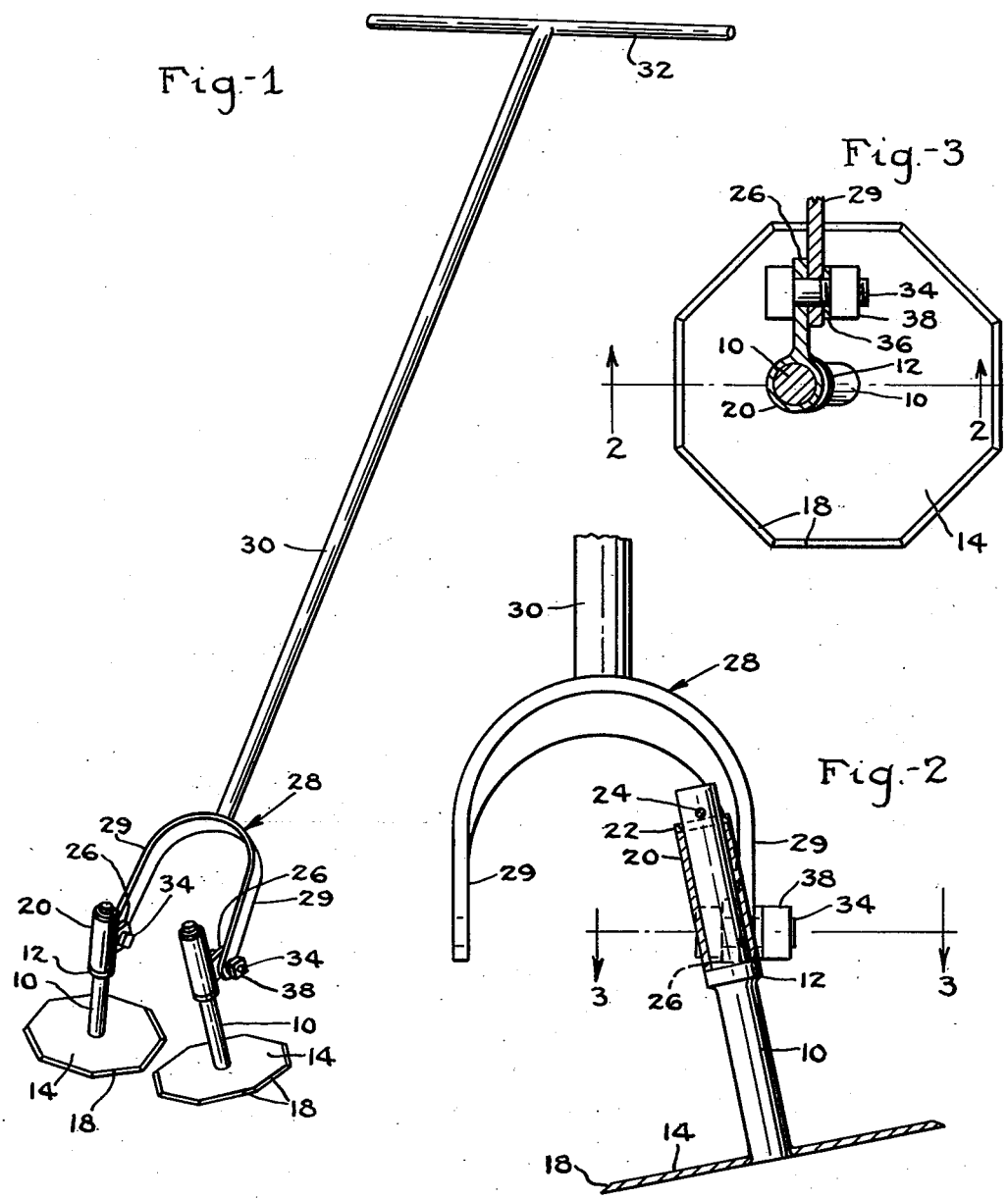

Nov. 7, 1950　　　　　H. BROWN　　　　　2,528,576
ROTARY CULTIVATOR
Filed July 22, 1946

Inventor:

Patented Nov. 7, 1950

2,528,576

UNITED STATES PATENT OFFICE 2,528,576

ROTARY CULTIVATOR

Harrison Brown, Fargo, N. Dak.

Application July 22, 1946, Serial No. 685,303

1 Claim. (Cl. 97—60)

The invention relates to rotary cultivators which may be attached to various cultivating implements, and constructed in a manner whereby it may be adjusted to meet varying soil conditions, for instance, moisture conditions and plant growth, and constructed in a manner whereby the discs will rotate through the soil, cultivating the soil by reason of the rotary action, and will remove weeds, and give balance and guidance to the rotary cultivating elements.

A further object is to provide a cultivator which will effectively conserve moisture by leaving the dry soil on the surface and the moist soil beneath the surface, eliminate clods and slabs, eliminate ruts, furrows, and channels, and eliminate a subsurface hardpan.

A further object is to provide a device which by simple adjustment permits the conversion of said unit into a cultivator, a tiller, a hiller, a crust breaker, a weeder, or a mulcher, and combinations of these implements and modifications thereof.

A further object is to provide a device which will reduce the costs of manufacturing, reduce the weight of the unit, save metals, secure a better and more varied form of tillage, and add to the ease of operation.

I attain these objects by a mechanism illustrated in the accompanying drawing in which Fig. 1 is an isometric view of the device, and in which Fig. 2 is a front view of the arch and rotary and a cross section view of the bearing in which the rotary revolves. Fig. 3 is a top view of the rotary and a cross section of the arch and extension supporting the bearing. Similar numbers refer to similar parts through the several views.

The handle bar 32 is a steel tube welded to handle shank 30 which in turn is welded to the curved part of the arch 28. Through the arch 28 on both the left and right sides thereof are drilled the holes whose center line is 3. Through both of the extensions 26, as appears in Fig. 1, is drilled a hole, the center line of which is 3. Through the extensions 26 and through the holes in the left and right side of arch 28 are passed the bolts 34 holding the extension 26 on the inside of the straight portion 29 of the arch 28. On each of said bolts 34 is placed lock washer 36, and on each of said bolts 34 is placed nut 38 for the purpose of holding extension 26 in place against the arch 28. Welded to extensions 26 are the bearings 20 at a fifteen degree angle with the vertical. Through said bearings 20 are inserted the pins 10, and welded to the pins 10 are collars 12, which collars prevent the pins 10 from sliding upward in the bearings 20. On top of the bearings 20 are placed the collars 22, and through the holes 24 is placed a pin rod to prevent the pins 10 from moving downward through the bearings 20. Welded to the pins 10 are the polygon octagonal discs 14. The octagon discs 14 are bevelled as designated by 18. The extensions 26 may be fastened for operational purposes by means of the bolts 34, nuts 38, to the outside of the arch 28 along the straight surface 29 of said arch 28. The pins 10 rotate in the bearings 20 permitting the rotation of discs 14. The loosening of nuts 38 and lock washers 36 on bolts 34 permits the movement of extensions 26 along the inside surface of the arch 28 so that bearings 20, pins 10, and discs 14 may be tipped forward or backward according to the type of cultivation desired; and the tightening of said nuts 38 holds the extensions 26, the bearings 20, the pins 10, and the discs 14 in a fixed position. The loosening of nuts 38 also permits the upward or downward movement of the arch 28 for the purpose of determining the height of the handle bar 32 for the convenience of the user; and the tightening of said nuts 34 hold arch 28, handle shank 30, and handle bar 32 in position and at a fixed elevation. The bevelled portions 18 of discs 14 produce a sharp edge for cutting weeds and penetrating the soil. A forward tipping of said discs 14 regulates soil penetration, and the fifteen degree angle at which said bearings 28 are welded to extensions 26 causes the discs 14 to rotate when the entire unit is pushed forward or pulled backward. The under surface of the discs 14 provides a base which assists in the balance and guidance of the unit when in operation. The rotary action of the discs 14, rotating in opposite directions, also assists in the guidance and balance of the unit when operating. The points of the octagon penetrating the soil assist in securing rotation and breaking and mulching of the soil. The flat surfaces of the discs 14 permit a scouring and are not clogged by their operation through the soil. The polygon shape of the discs provides points which do not permit the collection of soil, weeds, or roots.

I am conversant with the fact that prior to my invention rotary cultivators, tillers, hillers, crust breakers, weeders, and mulchers have been made which rotate through the soil by virtue of tipping the soil working unit at an angle, and I, therefore, do not claim any rights to the principle of rotation.

I claim:

A disc cultivator, said cultivator comprising spaced rigid supporting arms, bearing sleeves adjacent said arms, said bearing sleeves inclining downwardly and outwardly at an acute angle to the spaced supporting arms, an ear on each bearing sleeve disposed in a vertical plane, means pivotally connecting each ear to an associated supporting arm to provide for angular adjustment of the bearing sleeve to incline rearwardly, rotatable shafts rotatable in said sleeves and diverging downwardly and outwardly, the lower ends of said shafts being provided with cultivating discs in a plane at a right angle to the axis of the shafts.

HARRISON BROWN.

REFERENCES CITED

The following references are of record in the file of this patent:

UNITED STATES PATENTS

| Number | Name | Date |
|---|---|---|
| 409,818 | Bell | Aug. 27, 1889 |
| 841,488 | Doidge | Jan. 15, 1907 |
| 1,688,971 | Kammerer | Oct. 23, 1928 |
| 1,940,129 | Howe et al. | Dec. 19, 1933 |